United States Patent [19]

Runnells et al.

[11] 4,206,546

[45] Jun. 10, 1980

[54] TRACK SYSTEM

[75] Inventors: Robert R. Runnells, Kaysville; John C. Schmoegner, Kearns; Roland G. Larsen; Robert A. De La Mare, both of Salt Lake City, all of Utah

[73] Assignee: MDT Instrument Company, Tualatin, Oreg.

[21] Appl. No.: 888,220

[22] Filed: Mar. 20, 1978

[51] Int. Cl.2 ............................................. A61C 19/02

[52] U.S. Cl. ....................................................... 433/79

[58] Field of Search ...................... 32/22, 27; 312/301, 312/330 R, 9, 12

[56] References Cited

U.S. PATENT DOCUMENTS 3,359,575 12/1967 Nielsen .................................... 32/22

OTHER PUBLICATIONS

"Mobile Centura" by S. S. White Company, Phila., Penna., 6 pages, 10/29/67.

*Primary Examiner*—Robert Peshock

*Attorney, Agent, or Firm*—Trask & Britt

[57] ABSTRACT

A track system for a slidable tray of a dental instrument delivery system includes a stationary slide guide member, a movable slide body member and a floating bearing assembly interposed between these members in coupling arrangement.

5 Claims, 3 Drawing Figures

TRACK SYSTEM

RELATED APPLICATIONS

This application is related to U.S. Patent Application Ser. No. 890,652, filed Mar. 20, 1978, concurrently herewith. The related application discloses and claims a novel dental instrument delivery system with a movable upper tray surface. The present application discloses and claims a track assembly particularly usefule in connection with that system. The applications are commonly assigned, and the inventors of the aforesaid Ser. No.890,652, are co-inventors of this application. The disclosure of the aforesaid related application is hereby incorporated by reference to the extent that it is applicable hereto.

BACKGROUND OF THE INVENTION

1. Field

This invention pertains to dental instrument delivery systems and specifically provides a track assembly for mounting an upper tray in removable relation to the instrument deck of such a system.

2. State of the Art

Dental delivery systems which include an upper tray surface atop an instrument deck are in common use. It has recently been proposed to mount the upper tray surface in slidable relation to the deck so that the tray may be moved either to the right or left of the deck and be positioned in cantilever relation with the deck. Because the deck is generally positioned in the proximity of (often directly over) a dental patient, it is essential that the mounting mechanism for the tray have a pleasing, or at least unimposing appearance.

Available track systems, such as are used in mounting drawers and sliding doors, for example, are not suitable for cantilever support. Moreover, these and other track systems used in connection with cabinetry and the like, typically provide only limited travel, usually in a single direction with respect to a fixed end of a stationary track.

SUMMARY OF THE INVENTION

The present invention provides a track system especially adapted to support a tray surface in cantilever relation from opposite sides of the instrument deck of a dental instrument delivery system. The track system of this invention provides stable support for a loaded tray moved to either side of the deck so that substantially the entire tray is suspended from only a short coupled length of trachage.

The claimed trackage system comprises three components. A first member, called a slide guide is mounted atop the instrument deck, preferably within a recess provided for that purpose. Ideally, the slide guide extends the entire width of the deck, terminating at, or very near, its opposite side edges. Cosmetic considerations require that this member should not ordinarily project beyond either side edge.

A second member, called a slide body, couples, in slidable relation, with the first member, and is fixed to the bottom of a tray. This member should extend across substantially the entire width of the tray, but must terminate sufficiently short of the tray edges to be inconspicuous. If the slide guide is mounted within a recess in the instrument deck, the recess must be sufficiently wide to accommodate the slide body. Moreover, the depth of the recess with respect to the track components must be selected to provide clearance between the upper deck surface and the bottom of the tray.

The third member is a floating bearing assembly, including a pair of guide elements adapted to fit between the slide guide and slide body on opposite sides of the guide. Each guide element loosely contains rolling bearings, preferably ball bearings. The travel of the slide body with respect to the slide guide is limited by the length of the floating bearing assembly. Accordingly, it is important that this assembly be structured within a short length, preferably about two inches, but in no event longer than will permit eighty percent (80%) of the length of the sliding tray to project beyond either of the side edges of the deck.

A sliding tray mounted in accordance with this invention will measure somewhat over a foot in length, exclusive of its handles. A typical such tray, about 13 inches in length can be suspended by the claimed trackage system in stable condition with as much as 10½ inches of its length cantilevered beyond either edge of the instrument deck.

BRIEF DESCRIPTION OF THE DRAWINGS

In the drawings, which illustrate what is presently regarded as the best mode for carrying out the invention.

DESCRIPTION OF THE ILLUSTRATED EMBODIMENT

A dental instrument delivery system, indicated generally by the numeral 11, includes an instrument deck 12. A groove 13 formed in the top of the deck contains a slide guide 14 fixed firmly in position as shown.

Figure 1:
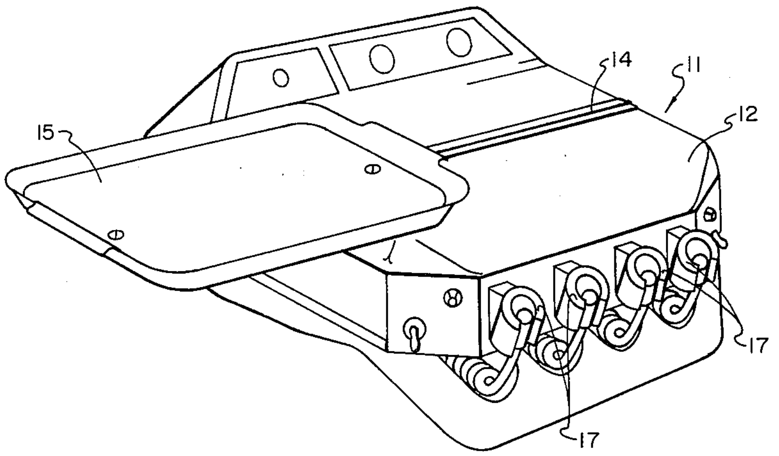
FIG. 1 is a pictorial representation of a dental instrument delivery system with a sliding tray mounted on a track system of this invention and cantilevered from one side edge of the deck.
Figure 2:
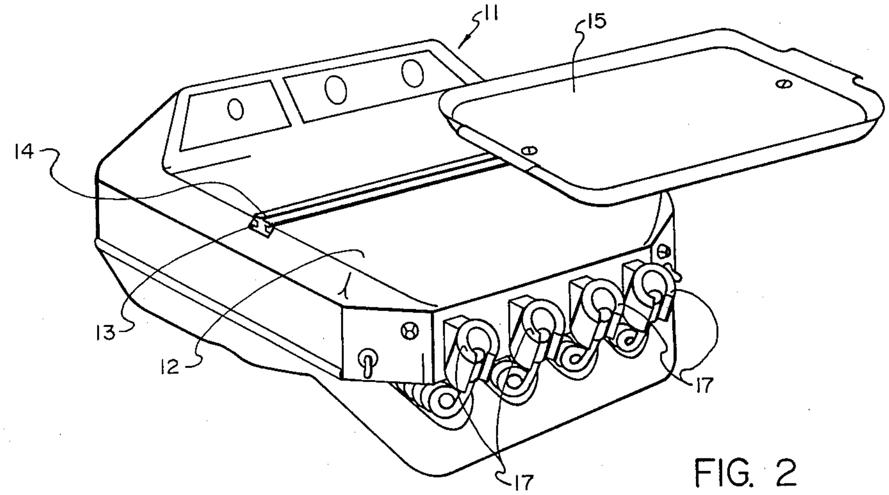
FIG. 2 is a similar view with the tray moved to the opposite side of the deck.
Figure 3:
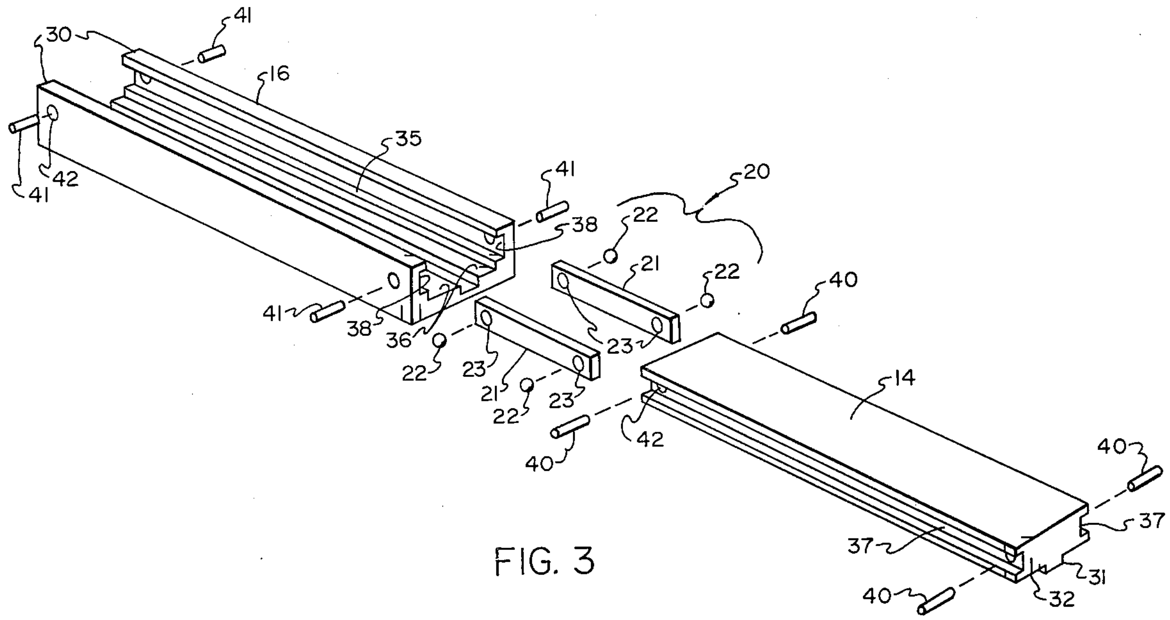
FIG. 3 is a pictorial exploded view of the track system of this invention rotated 180° so that it is shown as it would be viewed from beneath the tray.

A sliding tray 15 is attached to a slide body 16, shown upside down in FIG. 3. The slide body 16 mates with the slide guide 14 within the groove 13, providing only slight clearance between the tray 15 and the deck 12 as the tray is moved selectively from cantilever suspension overhanging a first edge (FIG. 1) to a similar position overhanging the opposite edge (FIG. 2) of the deck 12. In either position, the tray 15 is located behind but well to the side of the array of hand piece hangers 17 arranged along the front edge of the deck 12. Of course, the tray may be positioned at any location intermediate the extremes illustrated by FIGS. 1 and 2, if desired.

Referring specifically to FIG. 3, a floating bearing assembly, designated generally 20, includes a pair of bearing guides 21. These guides 21 may be of metal, but are preferably of a stiff, wear-resistant, non-abrasive material, such as nylon. A steel ball bearing 22 is carried within a hole 23 at each of each guide 21. The thickness of the guides is less than the diameter of the balls 22, the guide 21 serving mainly to maintain the spacing of the balls 22, thereby to avoid binding of the slide guide 14 and slide body 16. For example, a typical guide 21 for use with slide components 14, 16 approximately one foot in length will be about two inches long and about ⅛ inch thick and will retain a pair of balls 22 about ¼ inch in diameter spaced about 1½ to about 1¾ inches from each other.

It is essential that the guide 14 and body 16 members slide easily in either longitudinal direction. It is also essential that even in the extreme extended positions of FIGS. 1 and 2, the slide body 16 be firmly supported by the slide guide and held against substantial movement with respect to the guide 16 in any direction other than longitudinal. The floating bearing assembly, in combination with the special configurations of the members 14, 16, are thus critical to this invention.

The slide body 16 receives the slide guide 14 between its side walls 30, with slight clearance, on the order of 0.05 to 0.1 inch on each side of the guide 14. A rail 31 extends approximately the entire length of the guide 14 along its upper surface 32 (shown upside down in FIG. 3 for clarity). This rail 31 is received by a matching slot 33 in the slide body 16. Somewhat less clearance, typically about half that provided at the side walls 30, is provided for the interfitting of these elements 31, 33. The slot 33 is somewhat deeper than the height of the rail 31, and the slide guide 14 is somewhat thicker than the depth of the channel 35 within which it is received. Accordingly, any direct contact between the slide guide 14 and slide body 16 is limited to the unslotted portions of the upper inner surface 36 of the body member 16.

The ball bearings 22 travel within a pair of square tubular chambers defined by slots 37 along the edge of the slide guide 14 and matching slots 38 in the side walls 30 of the slide body 16. Travel of the assembly 20 is limited by roll pins 40 at opposite ends of the slide guide 14, while travel of the slide body is limited by roll pins 41 at the ends of the slide body 16. Corresponding roll pins 40, 41 are driven into bores 42 sufficiently to clear each other as the slide body 16 is moved across the slide guide 14, but a portion of each of these pins is left protruding into the slots 37, 38, respectively, to act as stops against the bearing guides 21.

The ball bearings 22 traveling in the chambers defined by the opposed slots 37 and 38, assure smooth travel of the tray 15 with very little frictional resistance. Equally important, however, when the tray 15 is cantilevered, as shown in either FIG. 1 or FIG. 2, the bearings 22 taken up substantially all of the clearance between the members 14, 16, assuring a rigid lateral coupling. Moreover, with the bearing assembly 20 and the roll pins 40, 41 installed, the individual balls 22 couple the members 14, 16 together so that the slide body 16 may not be lifted from the slide guide 14.

It is to be understood that the embodiments of the invention above described are merely illustrative of the application of the principals of the invention. Reference herein to details of the illustrated embodiment is not intended to limit the scop of the claims which themselves recite those features regarded as essential to the invention.

We claim:

1. In a dental instrument delivery system including an instrument deck with an upper tray surface, the improvement which comprises providing said surface on a tray mounted on a sliding track assembly including:
   - a slide guide member mounted atop said instrument deck;
   - a slide body member mounted to the bottom of said tray; and
   - a floating bearing assembly coupling said slide body to said slide guide;
   - said slide body being movable longitudinally with respect to said slide guide so that the tray may be suspended in cantilever relation over either of the side edges of said deck.

2. An improvement according to claim 1 wherein said floating bearing assembly comprises a pair of rolling bearing guides, each of which carries a pair of spaced bearings, one said bearing guide being positioned between said slide body and said slide guide on each side of said guide, the said bearings being received within chambers defined by opposing longitudinal slots carried by said slide guide and said slide body, thereby to couple said slide guide to said slide body.

3. An improvement according to claim 2 wherein said bearings are ball bearings.

4. An improvement according to claim 2 including stop means associated with said slide guide to limit the longitudinal travel of said floating bearing assembly and stop means associated with said slide body to limit the longitudinal travel of said tray.

5. An improvement according to claim 2 including a longitudinal rail atop said slide guide registered within a corresponding longitudinal slot within said slide body.

* * * * *

UNITED STATES PATENT OFFICE

CERTIFICATE OF CORRECTION

Patent No. 4,206,546 Dated 6/10/80

Inventor(s) Robert R. Runnells, et al

It is certified that error appears in the above-identified patent and that said Letters Patent are hereby corrected as shown below:

Col. 1, line 10, change "usefule" to---useful---;

Col. 1, line 51, change "trachage" to---trackage---;

Col. 2, line 61, between "each" and "of," add---end---;

Col. 3, line 44, change "taken" to---take---;

Col. 4, line 8, change "scop" to---scope---;

Col. 4, line 31, between "said" and "guide," add---slide---.

Signed and Sealed this

*Twenty-sixth* Day of *August 1980*

[SEAL]

*Attest:*

SIDNEY A. DIAMOND

*Attesting Officer* *Commissioner of Patents and Trademarks*